United States Patent [19]

Yaguchi

[11] Patent Number: 5,189,448
[45] Date of Patent: Feb. 23, 1993

[54] UNIT FOR SEARCHING FOR A LOST CONTACT LENS

[76] Inventor: Katsumi Yaguchi, 6-3, Iidabashi 1-Chome, Chiyoda-ku, Tokyo, Japan

[21] Appl. No.: 742,118
[22] Filed: Aug. 8, 1991
[51] Int. Cl.⁵ .......................... G02C 7/04; G02C 7/12
[52] U.S. Cl. ..................................... 351/162; 351/177
[58] Field of Search ............... 351/160 R, 160 H, 161, 351/162, 177

[56] References Cited

FOREIGN PATENT DOCUMENTS 3343389 6/1985 Fed. Rep. of Germany ...... 351/162
103121 5/1986 Japan .................................. 351/162

*Primary Examiner*—Scott J. Sugarman
*Attorney, Agent, or Firm*—Jordan and Hamburg

[57] ABSTRACT

To let one confirm the location of a contact lens which has been lost when one has intended to apply it to or remove it from the eyeball, a polarizing filter is used. The surface or side surface of a contact lens is coated with a polarizing filter so that when the contact lens has been lost, the location of the polarizing filter that is coated on the contact lens is allowed to be confirmed easily through a polarizing plate.

13 Claims, 2 Drawing Sheets

UNIT FOR SEARCHING FOR A LOST CONTACT LENS

FIELD OF THE INVENTION

The present invention relates to a contact lens, and more particularly to a contact lens whose lens section surface or side surface is coated with a polarizing filter so that it may be easily found when lost.

BACKGROUND OF THE INVENTION

Conventionally, contact lenses are intended to allow lenses to be freed from a frame and to permit lenses to be applied directly to the eyeball with inferior sight so that the sight may be improved and it is desired, for example, that contact lenses do not injure the eyeball and do not give the eyeball a sense of incongruity. However, since contact lenses are transparent, thin, and small, it is often very difficult to seek the lens if it has dropped accidentally near one's feet, for example, when applying or removing it from the eyeball. Further, if one steps on the lens while looking for it, it will become unusable, so that it is demanded that a contact lens must be handled with utmost care. Further when one has lost the contact lens, the seeking will take much time naturally and if one has an urgent business, he must sometimes buy a new one again, so that it is required that the location of the lost contact lens can be easily confirmed.

SUMMARY OF THE INVENTION

An object of the present invention is to provide a contact lens whose location can be easily confirmed if one has lost it, for example, when one has intended to apply it to the eyeball or to remove it from the eyeball.

The present invention uses a polarizing filter as means of allowing one to confirm the position of a lost contact lens. For example, a crystal of herapathite (quinine sulfate periodide) is opaque against vibrations in one direction over all the visible wavelength range but is transparent to vibrations across that direction over a relatively wide wavelength range. Therefore, nowadays, a polarizing filter is produced by orienting fine crystals of that material in one direction and arranging them on a glass plate or a celluloid thin film. That is, when two such polarizing filters are arranged with the directions of the crystals made perpendicular or parallel to each other, they became opaque or transparent, so that the positions of the polarizing filters can be visually confirmed.

The constitution of the contact lens according to the present invention includes a lens section that will be placed on the eyeball, a polarizing filter that is coated on the surface or side surface of the lens section, and a lens search means that allows one to confirm the position of the contact lens coated with the polarizing filter through a polarizing plate when the contact lens has been lost. Owing to this constitution wherein the polarizing filter is provided on the surface or side surface of the lens section, there is an effect that the position of the lens can be readily confirmed through the polarizing plate that is rotated or turned.

DESCRIPTION OF PREFERRED EMBODIMENTS

Figure 1:
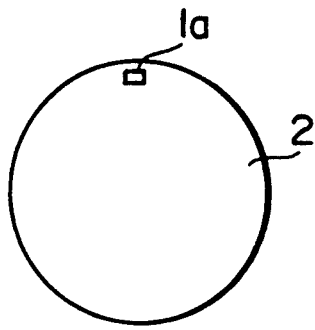
FIG. 1 is a schematic front view of a contact lens according to a first embodiment of the present invention wherein part of the lens section is coated with a polarizing filter.

With reference to FIG. 1, a contact lens according to a first embodiment of the present invention will now be described. A polarizing filter 1a is provided on the surface of a lens section 2 forming a contact lens. The lens section 2 is made of a glass or a soft plastic and is high in transmittance for visible rays. On the other hand, the polarizing filter 1a has a transmittance of about 50% and makes the field of vision dark. Therefore, a small part of the outer peripheral section of the lens section 2 is coated with the polarizing filter 1a.

Figure 2A:
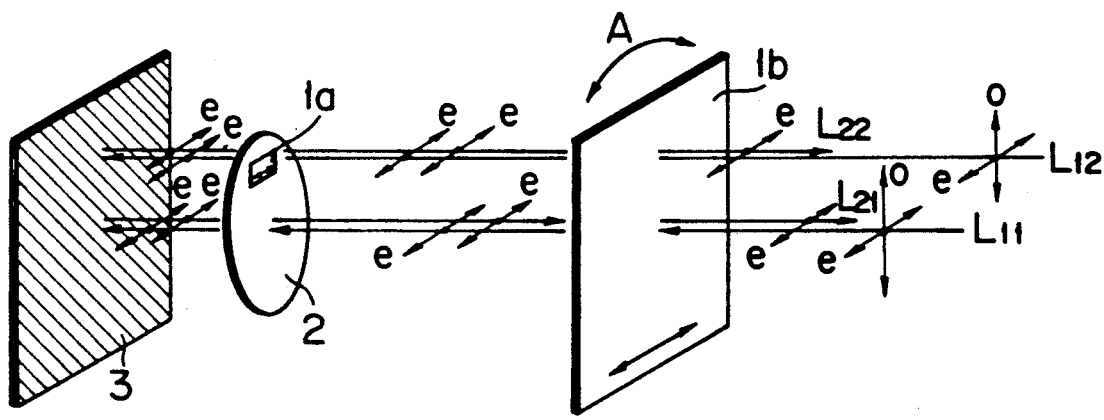
FIGS. 2 (a) and 2(b) are diagrams illustrating a search means for the contact lens shown in FIG. 1 that allows one to confirm the position of the polarizing filter through a polarizing plate.

FIGS. 2(a) and (b) are diagrams illustrating a search means of the present contact lens. In FIG. 2 (a), a contact lens the surface of the lens section 2 of which is coated with a polarizing filter 1a is placed on a floor 3. The floor 3 serves as a reflecting wall of a concrete, wood, or carpet. Beams L11, L12 include normal rays o and abnormal rays e that are polarized perpendicularly to each other and when they pass a polarizing plate 1b, for example, the normal rays o are absorbed. Then the abnormal rays e passed through the polarizing plate 1b strike the lens section 2 and the polarizing filter 1a of the contact lens. On this occasion, since the lens section 2 has no polarizing property, the beams L21, L22 having the abnormal rays e passed through the polarizing plate 1b pass through the lens section 2 as they are, then are reflected by the floor 3 and go back along the same optical axes. Consequently, if the polarizing plate 1b is rotated, the intensity of the light does not change. Further since the direction of polarization of the polarizing filter 1a is arranged so that only the abnormal rays e passing through the polarizing plate 1b may be allowed to pass through, if one sees the polarizing filter 1a through the polarizing plate 1b, one cannot clearly distinguish it from the lens section 2 and observes no difference between them.

Figure 2B:
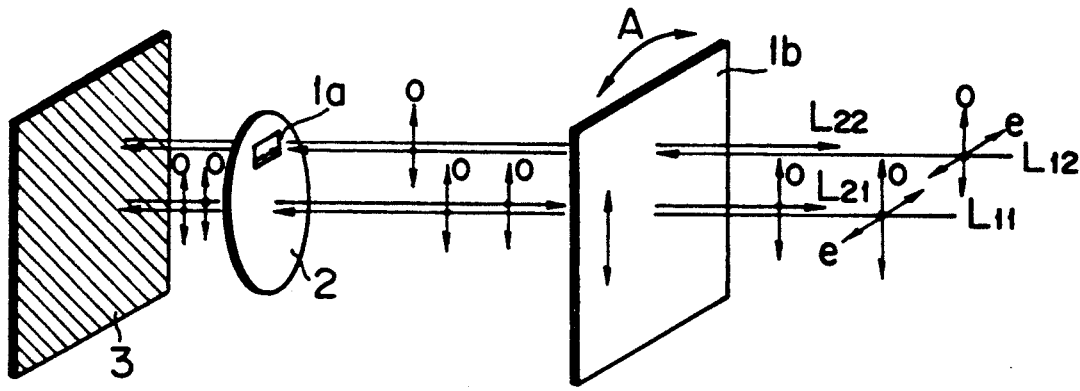

On the other hand, in FIG. 2(b), the polarizing plate 1b is rotated through an angle of 90° in the direction of an arrow A and only the normal beams o pass through the polarizing plate 1b. Here, light passes equally through the lens section 2 irrespective of the direction of polarization and the polarizing filter 1a allows the abnormal rays e only to pass through and cuts out the light from the polarizing plate 1b although FIG. 2 (b) looks like FIG. 2(a). Accordingly, the polarizing filter 1a seen through the polarizing plate 1b becomes dark and looks black. Therefore, a clear distinction occurs between the lens section 2 and the polarizing plate 1a.

Accordingly, when the contact lens of the present invention is searched while the the polarizing plate 1b is rotated or turned, the polarizing plate 1b looks as though it is repeatedly changing from light to dark, so that one's eye naturally catches the location of the contact lens and easily identifies the location.

Figure 3:
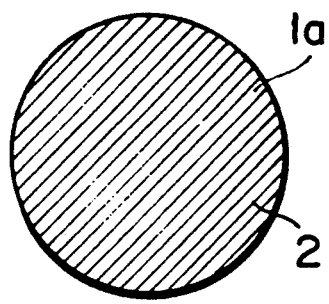
FIG. 3 is a schematic front view of a contact lens according to a second embodiment of the present invention wherein all the surface of the lens section is coated with a polarizing filter.

FIG. 3 illustrates a contact lens according to a third embodiment of the present invention wherein the whole surface of a lens section 2 is coated with a polarizing filter 1a. Although the object seen through it becomes darker than the case seen through a conventional contact lens, the illustrated contact lens can serve as moderate power sunglasses when the sunlight is strong, for example, as in summer.

Figure 4:
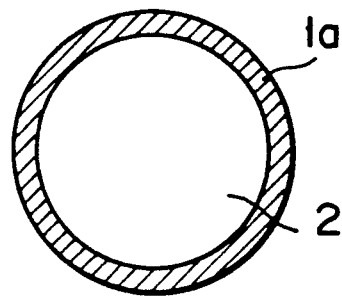
FIG. 4 is a schematic front view of a contact lens according to a third embodiment of the present invention wherein the surface outer periphery of the lens section is coated with a polarizing filter.

FIG. 4 illustrates a contact lens according to a third embodiment of the present invention wherein the outer periphery of a lens section 2 is coated with a polarizing an area filter 1a. The polarizing filter of this contact lens has larger than that of the polarizing filter 1a shown in FIG. 1 and makes the searching easy and because the polarizing filter 1a does not cover the pupil, it will not hinder eyesight.

Figure 5:
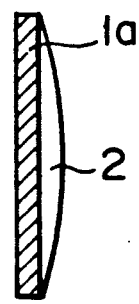
FIG. 5 is a schematic side view of a contact lens according to a fourth embodiment of the present invention wherein the side surface of the lens section is coated with a polarizing filter.

FIG. 5 illustrates a contact lens according to a third embodiment of the present invention wherein the side surface of a lens section 2 is coated with a polarizing filter 1a. The polarizing filter 1a does not cover the pupil at all and when the polarizing filter 1a is inclined slightly or the position of the polarizing filter 1a is changed a little, the contact lens can be located easily.

What is claimed is:

1. A device for searching for a lost contact lens, the combination comprising a contact lens, a polarizing filter on at least a part of said contact lens, and lens search means operable to facilitate viewing of said contact lens when said contact lens has been temporarily misplaced or lost, said lens search means comprising a polarizing plate operable to cause said polarizing filter on said contact lens to appear opaque when viewed through said polarizing plate.

2. A device according to claim 1, wherein said contact lens comprises a lens section which is placed on the eyeball, said lens section being made of transparent glass or plastic.

3. A device according to claim 1, wherein polarizing filter is coated on only a part of said lens.

4. A device according to claim 1, wherein said polarizing filter is coated on the entire surface of said lens.

5. A device according to claim 1, wherein said contact lens has an outer peripheral surface, said polarizing filter being coated on said outer peripheral surface.

6. A device according to claim 1, wherein said contact lens has an inner side surface and an outer side surface, said polarizing filter being coated on at least part of one of said side surfaces.

7. A device according to claim 1, wherein said contact lens has a central portion and an outer peripheral edge portion disposed about said central portion, said polarizing filter being coated on said outer peripheral edge and not on said central portion.

8. The combination comprising:
   a contact lens having a polarizing filter on at least a part thereof; and
   a polarizing plate operable to cause said polarizing filter on said contact lens to appear opaque when viewed through said polarizing plate such that said polarizing lens thereby facilitates locating a lost contact lens having said polarizing filter thereon.

9. The method of searching for a lost contact lens comprising the steps of:
   coating a polarizing filter on at least a part of a contact lens;
   providing a polarizing plate operable to cause said polarizing filter on said contact lens to appear opaque when viewed through said polarizing plate; and
   utilizing said polarizing plate as a viewer to search for said lost contact lens, whereby the polarizing filter on said lost contact lens will appear opaque when viewed through said polarizing plate.

10. The method of claim 9, wherein said polarizing plate has one orientation in which the polarizing filter on said lost lens appears opaque when viewed through said polarizing plate and another orientation in which the polarizing filter on said lost lens appear transparent when viewed through said polarizing plate, and further comprising changing the orientation of said polarizing plate such that the polarizing filter when viewed through said polarizing plate having its orientation changed appears successively opaque and transparent.

11. The method of claim 10 further comprising repeatedly changing the orientation of said polarizing plate such that the polarizing filter when viewed through said polarizing plate having its orientation repeatedly changed appears alternately opaque and transparent.

12. The method of claim 11, wherein said steps of changing the orientation of said polarizing plate comprises rotating said polarizing plate.

13. The method of claim 12, wherein said polarizing plate comprises a generally planar plate, said step of rotating said polarizing plate comprising rotating said polarizing plate around an axis perpendicular to said planar plate.

* * * * *